US005780546A

United States Patent [19]

Pugach et al.

[11] Patent Number: 5,780,546
[45] Date of Patent: Jul. 14, 1998

[54] BISPHENOL-A BASED POLYMERS HAVING LOW ORGANIC EMISSIONS

[75] Inventors: Joseph Pugach, Allegheny County; Thomas W. Smeal, Westmoreland County; Ronald A. Andrekanic, Allegheny County, all of Pa.

[73] Assignee: Aristech Chemical Corporation, Pittsburgh, Pa.

[21] Appl. No.: 762,112

[22] Filed: Dec. 9, 1996

[51] Int. Cl.⁶ ............... C08G 18/04; C08G 61/12; C08G 63/133

[52] U.S. Cl. ............ 525/28; 525/44; 525/293; 525/451; 525/454; 525/455

[58] Field of Search ................ 525/28, 44, 293, 525/451, 454, 455

[56] References Cited

U.S. PATENT DOCUMENTS

| | | | |
|---|---|---|---|
| 3,874,376 | 4/1975 | Dart et al. | 128/90 |
| 4,158,027 | 6/1979 | Restaino | 525/28 |
| 4,287,116 | 9/1981 | Burns | 525/28 |
| 4,296,215 | 10/1981 | Markiewitz | 424/28 |
| 5,393,830 | 2/1995 | Smeal et al. | 525/44 |
| 5,500,171 | 3/1996 | Smeal et al. | 264/309 |

*Primary Examiner*—Jeffrey C. Mullis
*Attorney, Agent, or Firm*—Robert R. Gavlik

[57] ABSTRACT

A low organic emission composition comprising a di-alkoxylated bisphenol-A dimaleate urethane dimethacrylate hybrid resin, an alkoxylated bisphenol-A diacrylate or dimethacrylate, ethylene glycol dimethacrylate and other vinyl monomers. The composition is useful in such applications as a substitute for prior art resins, such as polyester/vinyl ester based resins, typically used in fiberglass reinforced plastic applications.

13 Claims, No Drawings

BISPHENOL-A BASED POLYMERS HAVING LOW ORGANIC EMISSIONS

TECHNICAL FIELD

This invention relates to low organic emission compositions comprising an alkoxylated bisphenol-A based dimethacrylate urethane hybrid polymer in combination with one or more alkoxylated bisphenol-A dimethacrylate monomers. These compositions find use in applications such as fiberglass reinforced plastic applications. The polymers made from the compositions of the present invention may substitute for polyester/vinyl ester based polymers used in the art.

BACKGROUND OF THE INVENTION

U.K. Patent Nos. 1,352,063; 1,465,359; and U.S. Pat. No. 4,457,818 disclose vinyl urethane resins. The resins are prepared from a diisocyanate, a hydroxyl-terminated ester of acrylic or methacrylic acid, and a bisphenol-A based ester of maleic or fumaric acid. The resins are polymerized with styrene to give a thermoset polymer. These polymers are said to have improved properties over prior art vinyl urethane resins.

Smeal et al., in U.S. Pat. Nos. 5,292,841; 5,393,830; 5,492,668; 5,501,830; 5,500,171; and 5,534,211 disclose formations of low organic emission polyester based polymers with alkoxylated bisphenol-A dimethacrylate esters, ethylene glycol dimethacrylate and other vinyl monomers. In these polymers, the use of styrene is either eliminated, or significantly minimized. The results are polymers with typical physical properties that give off lower levels of organic emissions during the polymerization process.

SUMMARY OF THE INVENTION

Alkoxylated bisphenol-A dicarboxylic acid based dimethacrylate urethane hybrid resins (referred to herein as "hybrid resins") are typically prepared, as is known in the art, by reacting a polyol, an unsaturated dicarboxylic acid (herein interchangeable with anhydride), a hydroxyl terminated methacrylate ester and a diisocyanate. One typical synthesis of a hybrid resin includes reacting two moles of alkoxylated Bisphenol-A with one mole of an unsaturated dicarboxylic acid. The resulting diester is reacted with two moles of diisocyanate, and two moles of the hydroxyl terminated methacrylate ester. The hybrid resin has vinyl terminated end groups and a diacid double bond that act as cross-linking sites with other methacrylates such as alkoxylated bisphenol-A diacrylates or dimethacrylates (ABAD), ethylene glycol dimethacrylates (EGDM), and vinyl monomers. The hybrid resin is then blended, as is known in the art, with the alkoxylated bisphenol-A dimethacrylate, styrene and or vinyl toluene monomers and the remaining constituents. The resulting mixture is then polymerized.

As with the polymers disclosed in the Smeal et al references, the polymers of the present invention give off lower levels of volatile emissions during polymerization than similar polymers in the art. The polymers of the present invention will emit no more than about 20 g/m$^2$ as measured by Rule 1162 Standard Method for Static Volatile Emissions of the South Coast Air Quality Management District (California), as set forth in the Smeal et al patents. The benefits associated with polymers, useful in laminating operations, emitting low levels of organic emissions is well known in the art. The present invention is the first known application to the art of these hybrid polymers in this type of application. Additionally, these polymers are useful in molding applications.

DETAILED DESCRIPTION OF THE INVENTION

The resins of the present invention include compositions comprising about 20–50 wt % (based on the weight of the final product) of at least one hybrid resin. Preferably, 30–40 wt % is added. The preferred hydroxyl terminated methacrylate ester is hydroxy ethyl methacrylate ("HEMA"). The preferred diacid is maleic acid or anhydride. Preferred diisocyanates include toluene, methylene, isophorone and 4,4-dicyclohexylmethane diisocyanates. Preferred hybrid resins are di-6-ethoxylated bisphenol-A maleate urethane dimethacrylate, di-3-ethoxylated bisphenol-A maleate urethane dimethacrylate, and di-4-propoxylated bisphenol-A maleate urethane dimethacrylate.

The ABAD comprises about 25–45 wt % of the product. Preferably 30–40 wt % is used. The preferred ABADs include 3-, 6-, and 10-ethoxylated bisphenol-A dimethacrylate, and mixtures thereof.

Ethylene glycol dimethacrylate comprises about 10–20 wt % of the final product, preferably 15–20 wt % is used. Vinyl monomers comprise about 5–20 wt % of the final product. Preferably 10–15 wt % is used. Preferred vinyl monomers include styrene and vinyl toluene.

Tables I through V summarize experimental work performed by applicants in comparing various formulations to styrene control polymers. Typical wet polymer and mechanical properties were measured; viscosity, gel time, Rule 1162 volatile emissions, and barcol hardness cure development. These tests are well known in the art, and are set forth in detail e.g. in the Smeal et al patents listed above, and incorporated herein by reference. Polymer clear castings were prepared for tensile, flexural, heat distortion temperature (HDT), and water absorption properties. A standard room temperature cure initiator, and promoter were used. The castings were cured at room temperature for two hours and post-cured for two hours at 100° C.

Table I includes polymers utilizing 3- or 6-ethoxylated BPA based maleate/diester monomers. Toluene diisocyanate (TDI) and hydroxy methyl methacrylate (HEMA) were reacted with the maleate/diester to make the polyurethane hybrid resin. Polymers K-11, and N-11 contained the 6-EBPA based urethane resin with selected combinations of ABAD monomers. Polymers R-11, F-12 and R-12 contain the 3-EBPA urethane based resin with the ABAD monomers. Polymer G-12 is also a styrene control, and contains the 3-EBPA resin. Good compatibility was observed with these systems. Polymers containing both the 3- and 6-EBPA based vinyl urethane resins had much lower emissions than the styrene control.

Table II shows results of polymers containing di-4-propoxylated BPA (UPBPA) maleate urethane diester resin. Again, TDI was used as the monomeric base material for the urethane reaction. Three individual batches (307-07, 307-33, and 307-44) of the 4-PBPA vinyl urethane resin were evaluated with the ABAD monomers and with a styrene control. Polymer M-12 which was repeated twice had 25% resin while polymer 1-12 contained 30%. These formulations had typical viscosities that were comparable to the styrene control J-12.

Mechanical properties of the polymers containing the 4-PBPA vinyl urethane based resin/ABAD monomer blend combinations were comparable to the styrene controls. The barcol hardness development was better than the styrene control. Overall, better physicals were seen with polymers Y-12 and Z-12 containing approximately 43% of the urethane resin.

Table III lists polymers containing a 4-PBPA vinyl urethane resin using MDI as the monomeric base material for the urethane reaction instead of TDI. Two polymers were prepared and compared to a styrene control. The 4-PBPA MDI urethane resin had a higher viscosity than those using TDI. This is reflected in the much higher polymer viscosities with the MDI based resins compared to previous TDI formulations.

Table IV lists polymers containing the 4-PBPA vinyl urethane resin using isophorone diisocyanate as the monomeric base isocyanate for the urethane reaction. Polymer A-14 was the styrene control, while polymers B-14 through D-14 contained various combinations of resin with ABADs, EGDM and vinyl toluene. Formulation B-14 overall showed the best properties compared to the control. Polymer B-14 had lower volatile emissions and similar mechanical properties compared to A-14. The barcol hardness cure developments of these polymers are also better than the control. The styrene control had a sluggish and long interval cure time compared to the polymers containing the dimethacrylate monomers.

Table V lists formulations containing a vinyl terminated urethane polymer using a hydrogenated form of MDI as the pre-polymer in the diisocyanate reaction. Control formulation N-14 contains 59% of the resin and 41% styrene, while the remaining polymers (O-14, P-14, Q-14, and R-14) all contain different combinations of dimethacrylate esters and vinyl toluene. Mechanical properties of the polymers were comparable to the styrene control and overall had lower emissions. Viscosities of these materials are in acceptable ranges for both laminating and molding applications.

TABLE I

LOE POLYMERS CONTAINING 3&6EBPA URETHANE DIMETHACRYLATE RESINS WITH SELECTIVE COMBINATIONS OF 6EBPA DIMETHACRYLATE, ETHYLENE GLYCOL DIMETHACRYLATE & VINYLTOLUENE MONOMERS (TDI USED AS MONOMERIC BASE MATERIAL FOR URETHANE REACTION)

| RESIN # | K-11 | N-11 | R-11 | F-12 | G-12 | R-12 |
|---|---|---|---|---|---|---|
| COMPOSITION ,% | | | | | | |
| 146-178 6EBPa Vinyl Urethane Resin | 30 | 25 | — | — | — | — |
| 146-187 3EBPa Vinyl Urethane Resin | — | — | 30 | 25 | 50 | 40 |
| 6-EBPA DIMETHACRYLATE | 40 | 40 | 40 | 40 | — | 30 |
| ETH. GYLCOL DIMETHACRYLATE | 20 | 20 | 20 | 25 | — | 20 |
| VINYL TOLUENE (MONOMER) | 10 | 15 | 10 | 10 | — | 10 |
| STYRENE (MONOMER) | — | — | — | — | 50 | — |
| MOD L, 25% HQ (INHIBITOR) | 0.12 | 0.10 | 0.10 | 0.07 | 0.20 | 0.05 |
| COBALT 12%, (PROMOTER) | 0.30 | 0.30 | 0.35 | 0.30 | 0.30 | 0.30 |
| POTASSIUM 15%, (COPROMOTER) | 0.20 | 0.20 | 0.233 | 0.20 | 0.20 | 0.20 |
| DMAA, (COPROMOTER) | 0.30 | 0.30 | 0.35 | 0.30 | 0.30 | 0.30 |
| RESIN PROPERTIES (1) | | | | | | |
| BRKFLD VISCOSITY @ 77 F., (CPS) | 472 | 192 | 806 | 461 | 891 | 1525 |
| RM. TEMP. (77 F.) GEL TIME: (MIN.) | 22.0 | 21.0 | 30.0 | 24.5 | — | 22.0 |
| INTERVAL, (MINUTES) | 6.0 | 6.0 | 6.4 | 6.9 | — | 4.6 |
| PEAK EXOTHERM, (F.) | 282 | 307 | 288 | 302 | — | 282 |
| BARCOL HARDNESS- | | | | | | |
| 45 MINUTES | 39 | 39 | 42 | 41 | — | 39 |
| 1 HOUR | 41 | 41 | 43 | 43 | — | 40 |
| 2 HOUR | 40 | 41 | 43 | 44 | — | 43 |
| 3 HOUR | 40 | 40 | 43 | 43 | — | 43 |
| 4 HOUR | 40 | 40 | 43 | 44 | — | 44 |
| 24 HOURS | 40 | 44 | 43 | 45 | — | 44 |
| 1162 VOLATILE EMISSIONS, (G/M2) | 17.0 | 28.5 | 18.2 | 20 | 40.6 | 23.6 |
| EMISSION TIME, (MINUTES) | 7.0 | 9.5 | 13.5 | 11.5 | 22.5 | 8 |
| PHYSICAL PROPERTIES OF RESIN CLEAR CASTINGS: (1), (2) | | | | | | |
| TENSILE STRENGTH, (PSI) | 7,980 +/− 1,470 | 7,350 +/− 1,040 | 8,700 +/− 900 | 7,010 +/− 1,880 | 10,110 +/− 2,550 | 7,510 +/− 700 |
| TENSILE MODULUS, (MPSI) | 0.344 +/− 0.021 | 0.371 +/− 0.008 | 0.506 +/− 0.019 | 0.521 +/− 0.028 | 0.541 +/− 0.012 | 0.564 +/− 0.014 |
| TENSILE ELONGATION, (%) | 3.5 +/− 0.9 | 2.6 +/− 0.5 | 2.1 +/− 0.3 | 1.5 +/− 0.5 | 2.5 +/− 1.3 | 1.5 +/− 0.1 |
| FLEXURAL STRENGTH, (PSI) | 16,550 +/− 670 | 13,690 +/− 930 | 14,730 +/− 1,290 | 15,410 +/− 380 | 20,780 +/− 300 | 15,660 +/− 3,130 |
| FLEXURAL MODULUS, (MPSI) | 0.437 +/− 0.007 | 0.419 +/− 0.025 | 0.460 +/− 0.005 | 0.467 +/− 0.003 | 0.509 +/− 0.010 | 0.529 +/− 0.038 |
| HEAT DISTORTION TEMP: DTUL, F. | 155 | 164 | 170 | 167 | 170 | 169 |
| WATER ABSORPTION @ 150 F. | | | | | | |
| 24 HOURS: | 1.00 | 0.96 | 0.83 | 0.85 | 0.44 | 0.75 |
| 7 DAYS: | 1.64 | 1.40 | 1.29 | 1.31 | 0.67 | 1.36 |

(1)-1.5% HIPOINT 90 MEKP ROOM TEMPERATURE INITIATOR
(2) 2 HOUR ROOM TEMPERATURE (77 F.) CURE, 2 HOUR POSTCURE @ 100 C.
TOLUENE DIISOCYANATE WAS USED AS THE PREPOLYMER AND REACTED WITH THE MALEIC/DIESTER TO MAKE THE VINYL URETHANE RESIN

TABLE II

LOE POLYMERS CONTAINING 4PBPA URETHANE DIMETHACRYLATE
RESINS WITH SELECTIVE COMBINATIONS OF 6EBPA DIMETHACRYLATE,
ETHYLENE GLYCOL DIMETHACRYLATE & VINYLTOLUENE MONOMERS
(TDI USED AS MONOMERIC BASE MATERIAL FOR URETHANE REACTION)

| RESIN # | J-12 | J-12 | M-12 | M-12 |
|---|---|---|---|---|
| COMPOSITION, % | | (REPEAT) | | (REPEAT) |
| 307-07 4PBPA Vinyl Urethane Resin | 56.1 | — | 25 | — |
| 307-33 4PBPA Vinyl Urethane Resin | — | — | — | — |
| 307-44 4PBPA Vinyl Urethane Resin | — | 56.5 | — | 25 |
| 6-EBPA DIMETHACRYLATE | — | — | 45 | 45 |
| ETH. GYLCOL DIMETHACRYLATE | — | — | 20 | 20 |
| VINYL TOLUENE (MONOMER) | — | — | 10 | 10 |
| STYRENE (MONOMER) | 43.9 | 43.5 | — | — |
| MOD L, 25% HQ (INHIBITOR) | 0.15 | 0.15 | 0.08 | 0.08 |
| COBALT 12%, (PROMOTER) | 0.30 | 0.30 | 0.30 | 0.30 |
| POTASSIUM 15%, (COPROMOTER) | 0.20 | 0.20 | 0.20 | 0.20 |
| DMAA, (COPROMOTER) | 0.30 | 0.30 | 0.30 | 0.30 |
| RESIN PROPERTIES (1) | | | | |
| BRKFLD VISCOSITY @ 77 F., (CPS) | 118 | 151 | 237 | 247 |
| RM. TEMP. (77 F.) GEL TIME: (MIN.) | 25.0 | 24.0 | 19.0 | 22.8 |
| INTERVAL, (MINUTES) | 19.1 | 16.7 | 3.3 | 4.6 |
| PEAK EXOTHERM, (F.) | 282 | 291 | 284 | 293 |
| BARCOL HARDNESS- | | | | |
| 45 MINUTES | — | No Barcol Dev. | 42 | 46 |
| 1 HOUR | — | 32 | 44 | 47 |
| 2 HOUR | — | 31 | 45 | 45 |
| 3 HOUR | — | 34 | 45 | 46 |
| 4 HOUR | — | 36 | 45 | 46 |
| 24 HOURS | — | 36 | 46 | 48 |
| 1162 VOLATILE EMISSIONS, (G/M2) | 32.7 | 25.4 | 8.5 | 4.8 |
| EMISSION TIME, (MINUTES) | 35 | 37.5 | 7.7 | 8.0 |
| PHYSICAL PROPERTIES OF RESIN CLEAR CASTINGS: (1), (2) | | | | |
| TENSILE STRENGTH, (PSI) | 9,730 +/− 1,030 | 8,570 +/− 1,710 | 9,440 +/− 580 | 6,620 +/− 710 |
| TENSILE MODULUS, (MPSI) | 0.555 +/− 0.039 | 0.561 +/− 0.018 | 0.497 +/− 0.020 | 0.503 +/− 0.020 |
| TENSILE ELONGATION, (%) | 2.0 +/− 0.3 | 1.7 +/− 0.4 | 2.5 +/− 0.3 | 1.4 +/− 0.2 |
| FLEXURAL STRENGTH, (PSI) | 20,380 | 16,200 +/− 2,830 | 16,350 +/− 2,950 | 13,430 +/− 1,050 |
| FLEXURAL MODULUS, (MPSI) | 0.526 +/− 0.003 | 0.496 +/− 0.003 | 0.456 +/− 0.102 | 0.446 +/− 0.004 |
| HEAT DISTORTION TEMP: DTUL, F. | 190 | 205 | 179 | 182 |
| WATER ABSORPTION @ 150 F. | | | | |
| 24 HOURS: | 0.39 | 0.46 | 0.85 | 0.91 |
| 7 DAYS: | 0.67 | 0.73 | 1.32 | 1.38 |

| RESIN # | I-12 | T-12 | Y-12 | Z-12 |
|---|---|---|---|---|
| COMPOSITION, % | | | | |
| 307-07 4PBPA Vinyl Urethane Resin | 30 | — | — | — |
| 307-33 4PBPA Vinyl Urethane Resin | — | 45 | 42.9 | — |
| 307-44 4PBPA Vinyl Urethane Resin | — | — | — | 42.5 |
| 6-EBPA DIMETHACRYLATE | 40 | 30 | 38.1 | 37.5 |
| ETH. GYLCOL DIMETHACRYLATE | 20 | 15 | 9.5 | 10 |
| VINYL TOLUENE (MONOMER) | 10 | 10 | 9.5 | 10 |
| STYRENE (MONOMER) | — | — | — | — |
| MOD L, 25% HQ (INHIBITOR) | 0.05 | 0.03 | 0.06 | 0.08 |
| COBALT 12%, (PROMOTER) | 0.30 | 0.30 | 0.30 | 0.30 |
| POTASSIUM 15%, (COPROMOTER) | 0.20 | 0.20 | 0.20 | 0.20 |
| DMAA, (COPROMOTER) | 0.30 | 0.30 | 0.30 | 0.30 |
| RESIN PROPERTIES (1) | | | | |
| BRKFLD VISCOSITY @ 77 F., (CPS) | 250 | 1,395 | 2,810 | 2,280 |
| RM. TEMP. (77 F.) GEL TIME: (MIN.) | 20.5 | 21.0 | 16.5 | 30.0 |
| INTERVAL, (MINUTES) | 6.3 | 5.1 | 4.5 | 5.4 |
| PEAK EXOTHERM, (F.) | 282 | 280 | 264 | 273 |
| BARCOL HARDNESS- | | | | |
| 45 MINUTES | 43 | 38 | 45 | 44 |
| 1 HOUR | 43 | 44 | 46 | 45 |
| 2 HOUR | 41 | 45 | 47 | 45 |
| 3 HOUR | 41 | 45 | 47 | 47 |
| 4 HOUR | 41 | 44 | 47 | 48 |
| 24 HOURS | 42 | 45 | 47 | 47 |
| 1162 VOLATILE EMISSIONS, (G/M2) | 18.8 | 6.1–9.1 | 2.4 | 3.6 |

TABLE II-continued

LOE POLYMERS CONTAINING 4PBPA URETHANE DIMETHACRYLATE RESINS WITH SELECTIVE COMBINATIONS OF 6EBPA DIMETHACRYLATE, ETHYLENE GLYCOL DIMETHACRYLATE & VINYLTOLUENE MONOMERS (TDI USED AS MONOMERIC BASE MATERIAL FOR URETHANE REACTION)

| | | | | |
|---|---|---|---|---|
| EMISSION TIME, (MINUTES) | 13.3 | 9.0 | 11 | 5.5 |
| PHYSICAL PROPERTIES OF RESIN CLEAR CASTINGS: (1), (2) | | | | |
| TENSILE STRENGTH, (PSI) | 7,600 +/− 1,030 | 8,430 +/− 2,030 | 9,660 +/− 1,370 | 9,150 +/− 1,280 |
| TENSILE MODULUS, (MPSI) | 0.517 +/− 0.045 | 0.562 +/− 0.008 | 0.513 +/− 0.019 | 0.535 +/− 0.010 |
| TENSILE ELONGATION, (%) | 1.7 +/− 0.3 | 1.8 +/− 0.5 | 2.6 +/− 0.8 | 2.0 +/− 0.4 |
| FLEXURAL STRENGTH, (PSI) | 13,570 +/− 520 | 18,340 +/− 1,340 | 18,530 +/− 550 | 17,060 +/− 550 |
| FLEXURAL MODULUS, (MPSI) | 0.476 +/− 0.006 | 0.518 +/− 0.005 | 0.481 +/− 0.005 | 0.462 +/− 0.004 |
| HEAT DISTORTION TEMP: DTUL, F. | 170 | 163 | 221 | 171 |
| WATER ABSORPTION @ 150 F. | | | | |
| 24 HOURS: | 0.71 | 0.68 | 0.92 | 0.79 |
| 7 DAYS: | 1.26 | 1.26 | 1.46 | 1.38 |

(1)-1.5% HIPOINT 90 MEKP ROOM TEMPERATURE INITIATOR
(2) 2 HOUR ROOM TEMPERATURE (77 F.) CURE, 2 HOUR POSTCURE @ 100 C.
TOLUENE DIISOCYANATE WAS USED AS THE PREPOLYMER AND REACTED WITH THE MALEIC/DIESTER TO MAKE THE VINYL URETHANE RESIN

TABLE III

LOE POLYMERS CONTAINING 4 PBPA URETHANE DIMETHACRYLATE RESINS WITH SELECTIVE COMBINATIONS OF 6EBPA DIMETHACRYLATE, ETHYLENE GLYCOL DIMETHACRYLATE & VINYLTOLUENE MONOMERS (MDI USED AS MONOMERIC BASE MATERIAL FOR URETHANE REACTION)

| RESIN # | E-13 | F-13 | G-13 |
|---|---|---|---|
| COMPOSITION ,% | | | |
| 307-57 4PBPA Vinyl Urethane Resin | 30 | 48.3 | 34 |
| 6-EBPA DIMETHACRYLATE | 40 | — | 45 |
| ETH. GYLCOL DIMETHACRYLATE | 20 | — | 11 |
| VINYL TOLUENE MONOMER | 10 | — | 10 |
| STYRENE (MONOMER) | — | 51.7 | — |
| MOD L, 25% HQ (INHIBITOR) | 0.03 | 0.09 | 0.04 |
| COBALT 12%, (PROMOTER) | 0.30 | 0.30 | 0.30 |
| POTASSIUM 15%, (COPROMOTER) | 0.20 | 0.20 | 0.20 |
| DMAA, (COPROMOTER) | 0.30 | 0.30 | 0.30 |
| RESIN PROPERTIES (1) | | | |
| BRKFLD VISCOSITY @ 77 F., CPS | 1450 | 990 | 3780 |
| RM. TEMP. 77 F. GEL TIME: (MIN.) | 20 | ~20.0 | ~23.0 |
| INTERVAL, (MINUTES) | 3.6 | — | — |
| PEAK EXOTHERM, (F.) | 271 | — | — |
| BARCOL HARDNESS- | | | |
| 45 MINUTES | 50 | — | — |
| 1 HOUR | 50 | — | — |
| 2 HOUR | 51 | — | — |
| 3 HOUR | 51 | — | — |
| 4 HOUR | 51 | — | — |
| 24 HOURS | 51 | — | — |
| 1162 VOLATILE EMISSIONS, (G/M2) | 13.9 | 23.6 | 6.1 |
| EMISSION TIME, (MINUTES) | 7.0 | 109.0 | 7.0 |
| PHYSICAL PROPERTIES OF RESIN CLEAR CASTINGS: (1), (2) | | | |
| TENSILE STRENGTH, (PSI) | 9,866 +/− 461 | 11,062 +/− 318 | 9,104 +/− 997 |
| TENSILE MODULUS, (MPSI) | 0.486 +/− 0.011 | 0.492 +/− 0.014 | 0.492 +/− 0.011 |
| TENSILE ELONGATION, (%) | 2.7 +/− 0.3 | 3.4 +/− 0.5 | 2.2 +/− 0.4 |
| FLEXURAL STRENGTH, (PSI) | 17,867 +/− 373 | 18,838 +/− 84 | 17,461 +/− 474 |
| FLEXURAL MODULUS, (MPSI) | 0.473 +/− 0.010 | 0.460 +/− 0.004 | 0.446 +/− 0.019 |
| HEAT DISTORTION TEMP: DTUL, F. | 160 | 194 | 163 |
| WATER ABSORPTION @ 150 F. | | | |
| 24 HOURS: | 0.9 | 0.48 | 0.91 |
| 7 DAYS: | 1.42 | 0.62 | 1.43 |

(1)-1.5% HIPOINT 90 MEKP ROOM TEMPERATURE INITIATOR
(2) 2 HOUR ROOM TEMPERATURE (77 F.) CURE, 2 HOUR POSTCURE @ 100 C.
METHYLENE DIISOCYANATE WAS USED AS THE PREPOLYMER AND REACTED WITH THE MALEIC/DIESTER TO MAKE THE VINYL URETHANE RESIN

TABLE IV

LOE POLYMERS CONTAINING 4-EBPA URETHANE DIMETHACRYLATE RESINS WITH SELECTIVE COMBINATIONS OF 6EBPA DIMETHACRYLATE, ETHYLENE GLYCOL DIMETHACRYLATE & VINYLTOLUENE MONOMERS (IPDI USED AS MONOMERIC BASE MATERIAL FOR URETHANE REACTION)

| RESIN # | A-14 | B-14 | C-14 | D-14 |
|---|---|---|---|---|
| COMPOSITION, % | | | | |
| 307-94 4PBPA Vinyl Urethane Resin | 60 | 30 | 40 | 50 |
| 6-EBPA DIMETHACRYLATE | — | 40 | 30 | 30 |
| ETH. GYLCOL DIMETHACRYLATE | — | 20 | 20 | 15 |
| VINYL TOLUENE (MONOMER) | — | 10 | 10 | 5 |
| STYRENE (MONOMER) | 40 | — | — | — |
| MOD L, 25% HQ (INHIBITOR) | 0.14 | 0.12 | 0.12 | 0.14 |
| COBALT 12%, (PROMOTER) | 0.30 | 0.30 | 0.30 | 0.30 |
| POTASSIUM 15%, (COPROMOTER) | 0.20 | 0.20 | 0.20 | 0.20 |
| DMAA, (COPROMOTER) | 0.30 | 0.30 | 0.30 | 0.30 |
| RESIN PROPERTIES (1) | | | | |
| BRKFLD VISCOSITY @ 77 F., (CPS) | 137 | 212 | 312 | 4760 |
| RM. TEMP. (77 F.) GEL TIME: (MIN.) | 21 | ~20.0 | 15 | 58 |
| INTERVAL, (MINUTES) | 26.2 | ~3-4 | 5.5 | 6.8 |
| PEAK EXOTHERM, (F.) | 270 | ~280-290 | 282 | 275 |
| BARCOL HARDNESS- | | | | |
| 45 MINUTES | No Barcol Dev. | 48 | 47 | — |
| 1 HOUR | No Barcol Dev. | 50 | 48 | — |
| 2 HOUR | No Barcol Dev. | 49 | 49 | — |
| 3 HOUR | No Barcol Dev. | 49 | 50 | — |
| 4 HOUR | 8 | 50 | 50 | — |
| 24 HOURS | 14.4 | 51 | 52 | — |
| 1162 VOLATILE EMISSIONS, (G/M2) | 17 | 4.8 | 3 | — |
| EMISSION TIME, (MINUTES) | 47 | 2 | 3.5 | — |
| PHYSICAL PROPERTIES OF RESIN CLEAR CASTINGS: (1), (2) | | | | |
| TENSILE STRENGTH, (PSI) | 8,810 +/− 680 | 7,590 +/− 680 | 6,290 +/− 1,000 | 6,010 +/− 1,380 |
| TENSILE MODULUS, (MPSI) | 0.529 +/− 0.015 | 0.527 +/− 0.077 | 0.597 +/− 0.050 | 0.548 +/− 0.035 |
| TENSILE ELONGATION, (%) | 1.9 +/− 0.2 | 1.6 +/− 0.20 | 1.2 +/− 0.20 | 1.2 +/− 0.40 |
| FLEXURAL STRENGTH, (PSI) | 16,050 +/− 1,980 | 15,636 +/− 860 | 17,800 +/− 1,840 | 15,210 +/− 1,400 |
| FLEXURAL MODULUS, (MPSI) | 0.474 +/− 0.010 | 0.457 +/− 0.014 | 0.520 +/− 0.071 | 0.487 +/− 0.006 |
| HEAT DISTORTION TEMP: DTUL, F. | 171 | 160 | 160 | 142 |
| WATER ABSORPTION @ 150 F. | | | | |
| 24 HOURS: | 0.66 | 1.09 | 0.97 | 1.24 |
| 7 DAYS: | 1.1 | 1.58 | 1.55 | 1.86 |

(1)-1.5% HIPOINT 90 MEKP ROOM TEMPERATURE INITIATOR
(2) 2 HOUR ROOM TEMPERATURE (77 F.) CURE, 2 HOUR POSTCURE @ 100 C.
ISOPHORONE DIISOCYANATE WAS USED AS THE PREPOLYMER AND REACTED WITH THE MALEIC/DIESTER TO MAKE THE VINYL URETHANE RESIN

TABLE V

LOE POLYMERS CONTAINING 4-PBPA URETHANE DIMETHACRYLATE RESINS WITH SELECTIVE COMBINATIONS OF 6EBPA DIMETHACRYLATE, ETHYLENE GLYCOL DIMETHACRYLATE & VINYLTOLUENE MONOMERS (DCHMDI USED AS MONOMERIC BASE MATERIAL FOR URETHANE REACTION)

| RESIN # | N-14 | O-14 | P-14 | Q-14 | R-14 |
|---|---|---|---|---|---|
| COMPOSITION, % | | | | | |
| 307-1064PBPA Vinyl Urethane Resin | 59 | 20 | 30 | 40 | 25 |
| 6-EBPA DIMETHACRYLATE | — | 40 | 40 | 30 | 40 |
| ETH. GYLCOL DIMETHACRYLATE | — | 20 | 20 | 20 | 20 |
| VINYL TOLUENE (MONOMER) | — | 20 | 10 | 10 | 15 |
| STYRENE (MONOMER) | 41 | — | — | — | — |
| MOD L, 25% HQ (INHIBITOR) | 0.15 | 0.13 | 0.12 | 0.12 | 0.14 |
| COBALT 12%, (PROMOTER) | 0.30 | 0.30 | 0.30 | 0.30 | 0.30 |
| POTASSIUM 15%, (COPROMOTER) | 0.20 | 0.20 | 0.20 | 0.20 | 0.20 |
| DMAA, (COPROMOTER) | 0.30 | 0.30 | 0.30 | 0.30 | 0.30 |
| RESIN PROPERTIES (1) | | | | | |
| BRKFLD VISCOSITY @ 77 F., (CPS) | 165 | 61 | 258 | 660 | ~150 |
| RM. TEMP. (77 F.) FEL TIME: (MIN.) | 21 | 17 | 15 | 18 | ~20-25 |
| INTERVAL, (MINUTES) | 27 | 4.5 | 5.0 | 4.6 | — |

TABLE V-continued

LOE POLYMERS CONTAINING 4-PBPA URETHANE DIMETHACRYLATE
RESINS WITH SELECTIVE COMBINATIONS OF 6EBPA DIMETHACRYLATE,
ETHYLENE GLYCOL DIMETHACRYLATE & VINYLTOLUENE MONOMERS
(DCHMDI USED AS MONOMERIC BASE MATERIAL FOR URETHANE REACTION)

| RESIN # | N-14 | O-14 | P-14 | Q-14 | R-14 |
|---|---|---|---|---|---|
| PEAK EXOTHERM, (F.) | 280 | 302 | 280 | 277 | — |
| BARCOL HARDNESS- | | | | | |
| 45 MINUTES | No Barcol Dev. | 37 | 40 | 30 | — |
| 1 HOUR | No Barcol Dev. | 43 | 45 | 45 | — |
| 2 HOUR | No Barcol Dev. | 47 | 49 | 47 | — |
| 3 HOUR | No Barcol Dev. | — | — | — | — |
| 4 HOUR | No Barcol Dev. | 46 | 48 | 47 | — |
| 24 HOURS | 11 | 45 | 48 | 47 | — |
| 1162 VOLATILE EMISSIONS, (G/M2) | 15.7 | 24.2 | 6.1 | 4.8 | — |
| EMISSION TIME, (MINUTES) | 45 | 4.0 | 5.0 | 4.0 | — |
| PHYSICAL PROPERTIES OF RESIN CLEAR CASTINGS: (1), (2) | | | | | |
| TENSILE STRENGTH, (PSI) | 9,680 +/− 1,000 | 8,830 +/− 820 | 9,390 +/− 1,340 | 9,320 +/− 1,030 | 7,050 +/− 1,360 |
| TENSILE MODULUS, (MPSI) | 0.485 +/− 0.008 | 0.454 +/− 0.020 | 0.523 +/− 0.063 | 0.490 +/− 0.015 | 0.446 +/− 0.012 |
| TENSILE ELONGATION, (%) | 3.3 +/− 1.2 | 2.4 +/− 0.5 | 2.5 +/− 0.50 | 2.4 +/− 0.40 | 1.8 +/− 0.40 |
| FLEXURAL STRENGTH, (PSI) | 18,510 | 16,130 +/− 730 | 16,310 +/− 320 | 16,520 +/−820 | 13,730 +/− 1,220 |
| FLEXURAL MODULUS, (MPSI) | 0.439 +/− 0.011 | 0.412 +/− 0.002 | 0.420 +/− 0.003 | 0.437 +/− 0.003 | 0.380 +/− 0.003 |
| HEAT DISTORTION TEMP: DTUL, F. | 177 | 180 | 165 | 160 | 175 |
| WATER ABSORPTION @ 150 F. | | | | | |
| 24 HOURS: | 0.54 | 1.04 | 1.11 | 1.00 | 0.91 |
| 7 DAYS: | 0.84 | 1.34 | 1.55 | 1.54 | 1.36 |

(1)-1.5% HIPOINT 90 MEKP ROOM TEMPERATURE INITIATOR
(2) 2 HOUR ROOM TEMPERATURE (77 F.) CURE, 2 HOUR POSTCURE @ 100 C.
DICYCLOHEXYLMETHANE-4,4, DIISOCYANATE WAS USED AS THE PREPOLYMER & REACTED WITH THE MALEIC/DIESTER TO MAKE THE VINYL URETHANE RESIN

We claim:

1. A composition comprising:
   (a) about 20 to 50 wt % of at least one alkoxylated bisphenol-A diester urethane dimethacrylate hybrid resin;
   (b) about 25 to 45 wt % of at least one alkoxylated bisphenol-A diacrylate or dimethacrylate;
   (c) about 10 to 20 wt % of ethylene glycol dimethacrylate; and
   (d) about 5 to 20 wt % of at least one vinyl monomer.

2. A composition according to claim 1 wherein the hybrid resin comprises 30 to 40 wt % of the composition.

3. A composition according to claim 1 wherein the at least one alkoxylated bishpenol-A diacrylate or dimethacrylate comprises 30 to 40 wt % of the composition.

4. A composition according to claim 1 wherein the ethylene glycol dimethacrylate comprises 15 to 20 wt % of the composition.

5. A composition according to claim 1 wherein the at least one vinyl monomer comprises 10–15 wt % of the composition.

6. A composition according to claim 1 wherein the alkoxylated bisphenol-A dimethacrylate urethane hybrid resin comprises a reaction product of:
   (a) a polyol;
   (b) an acid or anhydride selected from the group consisting of maleic and fumaric acid or anhydride;
   (c) a hydroxyl terminated methacrylate ester; and
   (d) a diisocyanate.

7. A composition according to claim 6 wherein the hydroxyl terminated methacrylate ester is hydroxy ethyl methacrylate.

8. A composition according to claim 6 wherein the diisocyatate is selected from the group consisting of toluene, methylene, isophorone, and 4,4-dicyclohexylmethane diisocyanates.

9. A composition according to claim 1 wherein the alkoxylated bisphenol-A diacrylate or dimethacrylate is an ethoxylated bisphenol-A dimethacrylate.

10. A composition according to claim 9 wherein the ethoxylated bisphenol-A dimethacrylate is selected from the group consisting of 3-, 6-, and 10-ethoxylated bisphenol-A dimethacrylate.

11. A composition according to claim 1 wherein the hybrid resin is selected from the group consisting of di-6-ethoxylated bisphenol-A maleate urethane dimethacrylate, di-3-ethoxylated bisphenol-A maleate urethane dimethacrylate, and di-4-propoxylated bisphenol-A maleate urethane dimethacrylate.

12. A composition according to claim 1 wherein the at least one vinyl monomer is selected from the group consisting of styrene and vinyl toluene.

13. A method of making a low volatile emission alkoxylated bisphenol-A diester urethane dimethacrylate hybrid polymer comprising the steps of:
   (a) reacting a polyol and a dicarboxcylic acid or anhydride to form a diester;
   (b) reacting said diester with a diisocyanate and a hydroxyl terminated methacrylate ester to form a hybrid resin; and
   (c) contacting said hybrid resin with (i) an alkoxylated bisphenol-A diacrylate or dimethacrylate, (ii) ethylene glycol dimethacrylate, and (iii) at least one vinyl monomer, wherein said hybrid resin comprises about 20 to 50 wt % of the composition, said alkoxylated bisphenol-A diacrylate or dimethacrylate comprises about 25 to 45 wt % of the composition, said ethylene glycol dimethacrylate comprises about 10 to 20 wt % of the composition, and said at least one vinyl monomer comprises about 5 to 20 wt % of the composition.

* * * * *